United States Patent
Jago et al.

(10) Patent No.: US 7,537,567 B2
(45) Date of Patent: May 26, 2009

(54) ULTRASONIC SPATIAL COMPOUNDING WITH MULTIPLE SIMULTANEOUS BEAM TRANSMISSION

(75) Inventors: James Jago, Seattle, WA (US); Brent Robinson, Kirkland, WA (US)

(73) Assignee: Koninklijke Philips Electronics, N.V. (NL)

( * ) Notice: Subject to any disclaimer, the term of this patent is extended or adjusted under 35 U.S.C. 154(b) by 314 days.

(21) Appl. No.: 10/570,193

(22) PCT Filed: Aug. 6, 2004

(86) PCT No.: PCT/IB2004/051415
§ 371 (c)(1),
(2), (4) Date: Mar. 1, 2006

(87) PCT Pub. No.: WO2005/024462
PCT Pub. Date: Mar. 17, 2005

(65) Prior Publication Data
US 2006/0293596 A1 Dec. 28, 2006

Related U.S. Application Data (60) Provisional application No. 60/501,795, filed on Sep. 10, 2003.

(51) Int. Cl.
*A61B 8/00* (2006.01)
(52) U.S. Cl. ...................................... 600/447
(58) Field of Classification Search ............... 600/437, 600/443, 447, 455, 448, 459, 441
See application file for complete search history.

(56) References Cited

U.S. PATENT DOCUMENTS 4,159,462 A * 6/1979 Rocha et al. ............... 367/97

(Continued)

FOREIGN PATENT DOCUMENTS

EP 0 442 450 A 8/1991

OTHER PUBLICATIONS

Krestel, K., "Imaging Systems for Medical Diagnostics," 1990, Siemens Aktiengesellschaft, Berlin, XP002312413, p. 208, paragraph 6.3.2—p. 212.

(Continued)

*Primary Examiner*—Eric F Winakur
*Assistant Examiner*—Lawrence N Laryea
(74) *Attorney, Agent, or Firm*—W. Brinton Yorks, Jr.

(57) ABSTRACT

An ultrasonic diagnostic imaging system and method are described in which spatially compounded images are produced by transmitting ultrasound beams in different directions during a common transmit-receive interval. Echoes are received from the different beam directions and are beamformed by a multiline beamformer to produce differently steered beams of coherent echo signals. The echoes are combined on a spatial basis with echoes from different look directions which correspond to the same spatial location being combined. The resulting spatially compounded image is displayed.

19 Claims, 9 Drawing Sheets

U.S. PATENT DOCUMENTS

| | | | |
|---|---|---|---|
| 4,561,019 | A | 12/1985 | Lizzi et al. |
| 4,596,145 | A | 6/1986 | Smith et al. |
| 4,644,795 | A | 2/1987 | Augustine |
| 5,318,033 | A | 6/1994 | Savord |
| 5,469,851 | A | 11/1995 | Lipschutz |
| 5,485,842 | A | 1/1996 | Quistgaard |
| 5,860,924 | A | 1/1999 | Quistgaard |
| 6,126,598 | A | 10/2000 | Entrekin et al. |
| 6,132,376 | A | 10/2000 | Hossack |
| 6,135,956 | A | 10/2000 | Schmiesing et al. |
| 6,179,780 | B1 | 1/2001 | Sumanaweera et al. |
| 6,210,328 | B1 | 4/2001 | Robinson et al. |
| 6,224,552 | B1 | 5/2001 | Jago et al. |
| 6,282,963 | B1 | 9/2001 | Haider |
| 6,406,430 | B1 * | 6/2002 | Ishrak et al. ............... 600/441 |
| 6,436,046 | B1 * | 8/2002 | Napolitano et al. ......... 600/447 |
| 6,440,075 | B1 * | 8/2002 | Averkiou .................... 600/443 |
| 6,471,652 | B2 | 10/2002 | Fraser et al. |
| 6,547,732 | B2 | 4/2003 | Jago |
| 6,585,648 | B1 | 7/2003 | Robinson |
| 6,676,603 | B2 * | 1/2004 | Aichhorn et al. ............ 600/447 |
| 6,695,783 | B2 | 2/2004 | Henderson et al. |
| 6,730,033 | B2 * | 5/2004 | Yao et al. .................... 600/443 |
| 2002/0117004 | A1 | 8/2002 | Satoh |
| 2002/0198455 | A1 * | 12/2002 | Ossmann et al. ............ 600/459 |

OTHER PUBLICATIONS

Wells, P.N.T., "Ultrasonic Imaging of the Human Body," Rep. Prog. Phys., vol. 62, 1999, pp. 671-722, XP002312412 UK, p. 692, paragraph 4.4.

Shen, J., et al., "A New Coded-Excitation Ultrasound Imaging System—Part I: Basic Principles," IEEE Transactions on Ultrasonics, Ferroelectronics and Frequency Control, IEEE Inc., New York, US, vol. 43, No. 1, 1996, pp. 131-140, XP000557497, ISSN:0885-3010.

* cited by examiner

ULTRASONIC SPATIAL COMPOUNDING WITH MULTIPLE SIMULTANEOUS BEAM TRANSMISSION

CROSS REFERENCE TO RELATED APPLICATION

This application claims the benefit of U.S. provisional application Ser. No. 60/501,795 filed Sep. 10, 2003, which is incorporated herein.

This invention relates to ultrasonic diagnostic imaging and, more particularly, to ultrasonic spatial compounding imaging systems which use multiple simultaneous transmit beams.

Ultrasonic diagnostic imaging systems, operating as they do with coherent waves of ultrasound, produce images with an artifact known as speckle. Speckle can give smooth, uniform tissue a somewhat mottled appearance in an image. At times the speckle pattern of an ultrasound image has diagnostic utility, as some pathology can be identified in an image by a speckle pattern differing from that of the surrounding tissue. At other times the speckle pattern is an unwanted impediment to diagnosis and should be reduced or eliminated if possible. Two methods for reducing speckle are in common use in ultrasound, both utilizing signal averaging. One is known as frequency compounding, by which echo signals of different frequency bands are received from each point in an image field. The differing frequency bands will produce signals from the same target with different speckle patterns. When the different frequency signals from the target are combined, the speckle characteristic is reduced by a factor of up to the square root of the number of distinct frequency bands. See, for example, U.S. Pat. No. 4,561,019 (Lizzi et al.)

Another method for reducing speckle is known as spatial compounding. In spatial compounding, echoes are received from each point in the image field from different directions. The signals from the different directions will exhibit different speckle patterns so that, when combined, the speckle characteristic is again reduced, this time by a factor of up to the square root of the number of distinct look directions. Examples of ultrasound systems which use spatial compounding to reduce speckle can be found in our U.S. Pat. No. 6,210,328 (Robinson et al.) and U.S. Pat. No. 6,126,598 (Entrekin et al.) In addition to reducing speckle, the curved borders of anatomy in the body are more clearly defined in a spatially compounded image.

A drawback to spatial compounding is the need to transmit multiple beams to each point in an image field, which increases the time needed to acquire an image and hence reduces the image frame rate of display. For example, if it is desired to interrogate each point in an image from three different look directions, three beams must be used to interrogate each point in the image field instead of one. The image acquisition time is tripled and the frame rate is one one-third of that which could be attained without spatial compounding.

One solution to the frame rate decline is to reduce the line density of the beams used to scan the image field. By transmitting fewer, more widely spaced beams, the frame rate is increased. However, this will reduce spatial resolution as interpolation is usually required to fill the spaces between beams and other artifacts may occur if the result is to spatially undersample the image region. Another solution to this problem of frame rate reduction would be to employ multiline reception. In multiline operation, multiple, spatially displaced beams are received and processed at the same time. The conventional way to do this is to transmit a "fat" beam which insonifies a broad area or volume of the image field, then to steer and focus multiple receive beams from the insonified area or volume. See, for example, the systems described in U.S. Pat. No. 4,596,145 (Smith et al.) and U.S. Pat. No. 5,469,851 (Lipschutz). However, since not all receive beams within the fat transmit beam are uniformly insonified, line-to-line artifacts known as "jail bar" artifacts can arise. Steps which may be taken to reduce the effects of these artifacts include widening and flattening the transmit beams as shown in U.S. Pat. No. 4,644,795 (Augustine) and U.S. Pat. No. 6,585,648 (Robinson) or spatially filtering the received signals as shown in U.S. Pat. No. 5,318,033 (Savord). These approaches also tend to reduce spatial resolution. Accordingly it would be desirable to increase the frame rate of spatially compounded images but without creating deleterious artifacts in the image.

In accordance with the principles of the present invention, spatial compounding is performed by scanning the image field with multiple, differently steered transmit beams within the same transmit-receive interval. Receive beams are acquired in response to each transmit beam such that the centers of the transmit and receive beams are aligned. This beam alignment eliminates the jail bar artifacts caused by non-aligned transmit and receive beams and enables good lateral spatial resolution to be achieved. Thus, multiple beams from different steering directions are formed each transmit-receive interval, enabling points within the image region to be scanned from multiple look directions with an increased frame rate of display.

Figure 1:
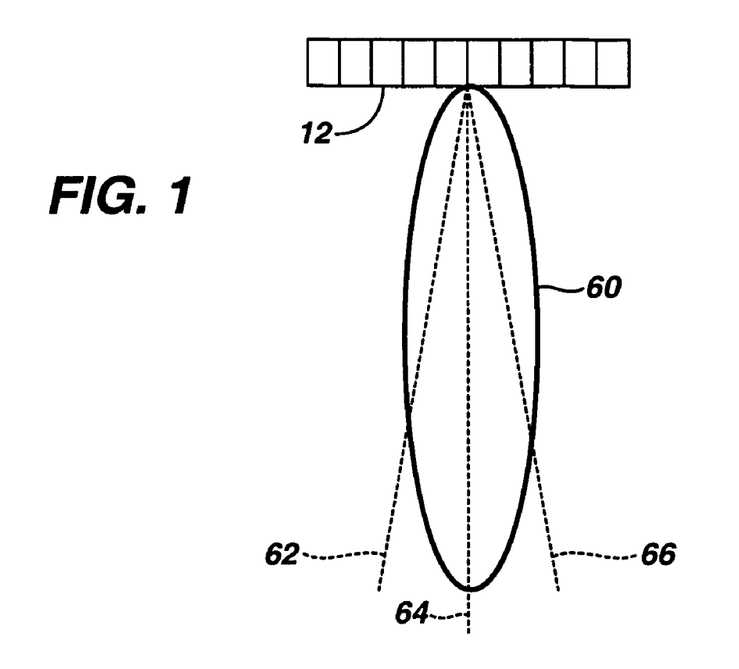
FIG. 1 illustrates multiline reception in response to transmission of a "fat" beam.

Referring first to FIG. 1, the transmit-receive scheme for conventional "fat" beam multiline is shown. A transmit beam having a broad main lobe pattern 60 is transmitted by an array transducer 12. The broad transmit beam 60 will insonify a wide space within the image region so that multiple, incrementally spaced receive beams can be formed from the received echo signals. Three receive beams 62, 64, and 66 are received in this example within the region insonified by the transmit beam 60. As is well known, the beam pattern of an ultrasound beam is not uniform in intensity across the beam. At the focal region it exhibits the greatest acoustic pressure down the axis in the center of the beam. The acoustic intensity rolls off on either side of the beam center. This means that the center receive beam 64 will be more strongly insonified than the receive beams 62 and 64 on either side of the beam center. As beams are transmitted and received across the image field, a repetitive pattern of beams which have been insonified to different intensities is received, and this pattern of acoustic pressure variation across the aperture is a source of jail bar artifacts. Even if the on-axis intensities are uniform, asymmetries in the sidelobe structure and different phase responses of the round-trip beams can cause these artifacts.

Figure 2:
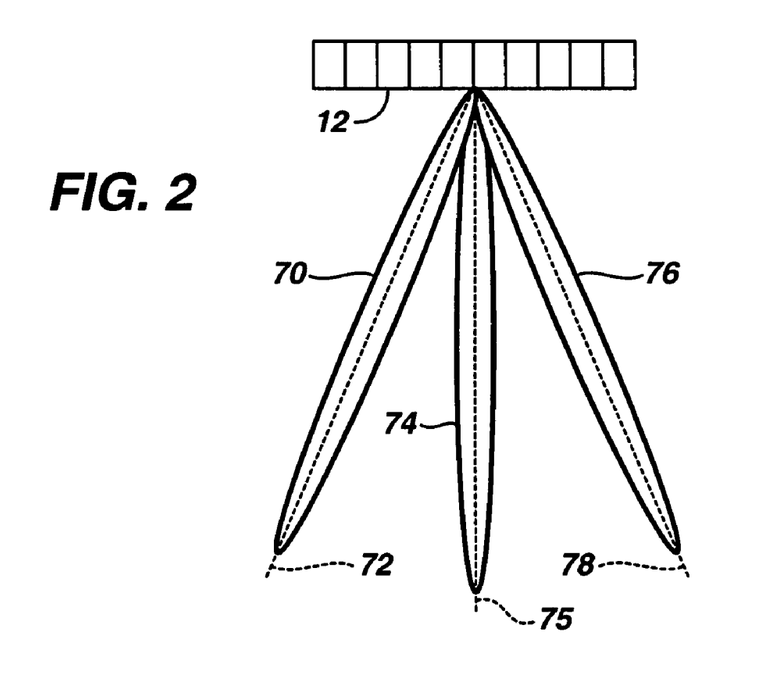
FIG. 2 illustrates a multiline transmit-receive sequence for spatial compounding in accordance with the principles of the present invention.

FIG. 2 illustrates a multiline transmit-receive sequence for spatial compounding in accordance with the principles of the present invention. Instead of transmitting one fat transmit beam as in FIG. 1, multiple differently steered relatively narrower beams 70, 74, and 76 are transmitted simultaneously, that is, during the same transmit-receive interval. In this example three such beams are transmitted, but a greater or lesser number can be used depending upon the degree of spatial compounding desired. The beams 70, 74 and 76 are steered in three different directions so that points within the image field will be sampled from three different look directions as is illustrated below in FIG. 7. In response to each of the transmit beams 70, 74, and 76, a receive beam 72, 75, and 78 is received which is aligned with the center of each transmit beam. Each receive beam is thus insonified to the same level, which in this example is at the beam center of maximum intensity and is co-axial with the respective transmit beam. Consequently the jail bar artifact is eliminated.

A drawback to the transmission of multiple simultaneous beams is that the received signals for each beam are cluttered with echoes from the other beams, which reduces the signal-to-noise characteristic of the signals. The clutter tends to be different between the different beams that will be compounded at each image point. Therefore, since multiple signals from different look directions are being combined to form the spatially compounded image signals, much of this signal-to-noise degradation is recaptured by this use of combined signals. The signal-to-noise characteristic improves with increase in the degree of spatial compounding, that is, the number of samples from different look directions which are combined to form each image signal.

Figure 3:
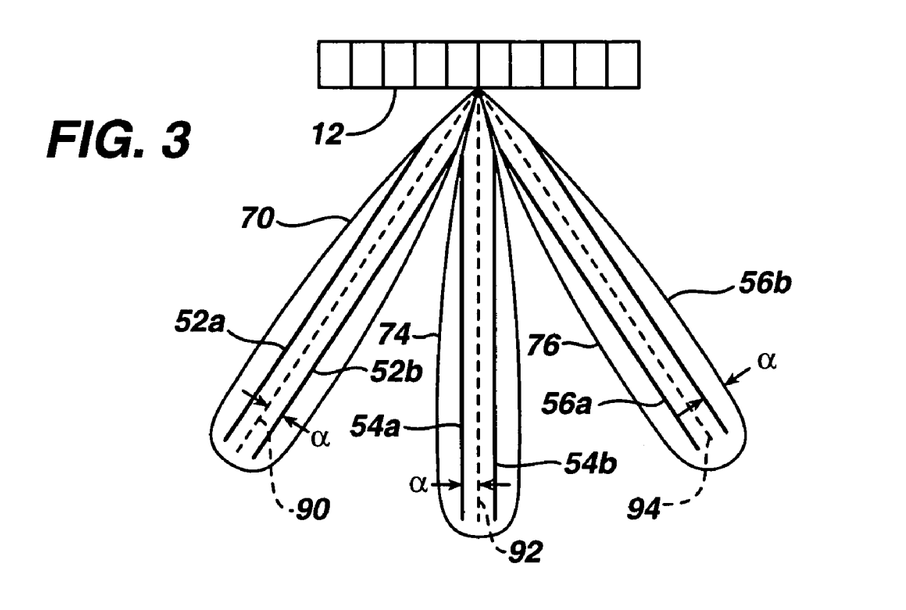
FIG. 3 illustrates a second embodiment of a transmit-receive sequence in accordance with the principles of the present invention.

FIG. 3 illustrates another embodiment of the present invention in which each transmit beam is a fat beam for the acquisition of multiple receive beams for each look direction. Within the transmit beam pattern 70, 74, and 76 of each transmit beam, two receive beams, 52a and 52b; 54a and 54b; and 56a and 56b, are formed by the receive beamformer. Each of these receive beams is offset from the beam centers 90, 92, and 94 by the same distance α so that each of the receive beams is equally insonified by its respective transmit beam. This embodiment is useful when higher order spatial compounding, greater frame rates, or greater line densities are desired. In this example it is seen that two beams are received from each of three different look directions (three different transmit steering angles with respect to the plane of the transducer array). For three dimensional imaging a two dimensional array transducer can be used as the array transducer 12, producing transmit beam patterns which are circular about each beam axis 90, 92 and 94. This enables an even higher order of multiline to be employed for each transmit beam. For instance, four receive beams could be received within each 3D beam pattern, spaced at 90° increments around each transmit beam axis and each receive beam being offset by the same distance from the transmit beam axis.

Figure 4:
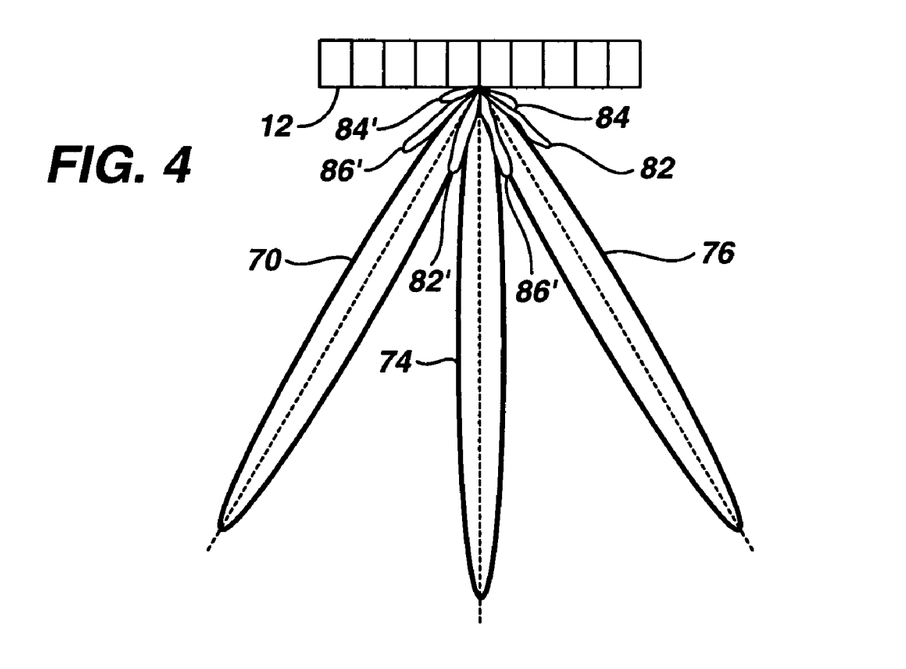
FIG. 4 illustrates an embodiment of the present invention in which beam steering in done in consideration of the lobe pattern of the point spread function.

An ultrasound beam does not comprise a single main lobe, but often exhibits side lobes and other off-axis responses located on either side of the main lobe. The receive beams are located only within the main lobe of the transmit beam and thus the side lobes can result in the production of off-axis echo signal reception which is undesirable and comprises clutter in the image. In FIG. 4 the main lobe 76 of the rightmost beam is shown with side lobes 82, 86 and 84. The size and locations of these side lobes are a function of the aperture and apodization used for the beam, among other factors. In FIG. 4 the unwanted clutter reception caused by these side lobes is reduced by steering the beams so that the side lobes, and particularly the lower order (nearest) side lobes, fall between the main lobes 70, 74, 76 of the other beams rather than spatially overlapping the main lobe of another beam. For instance, the side lobe 86 of beam 76 falls between main lobes 74 and 76, and the side lobe 82' of beam 70 falls between main lobes 70 and 74, thereby reducing side lobe clutter. In practice the composite transmit apodization function is tailored to yield an appropriate lobe pattern for the desired beam directions.

Figure 5:
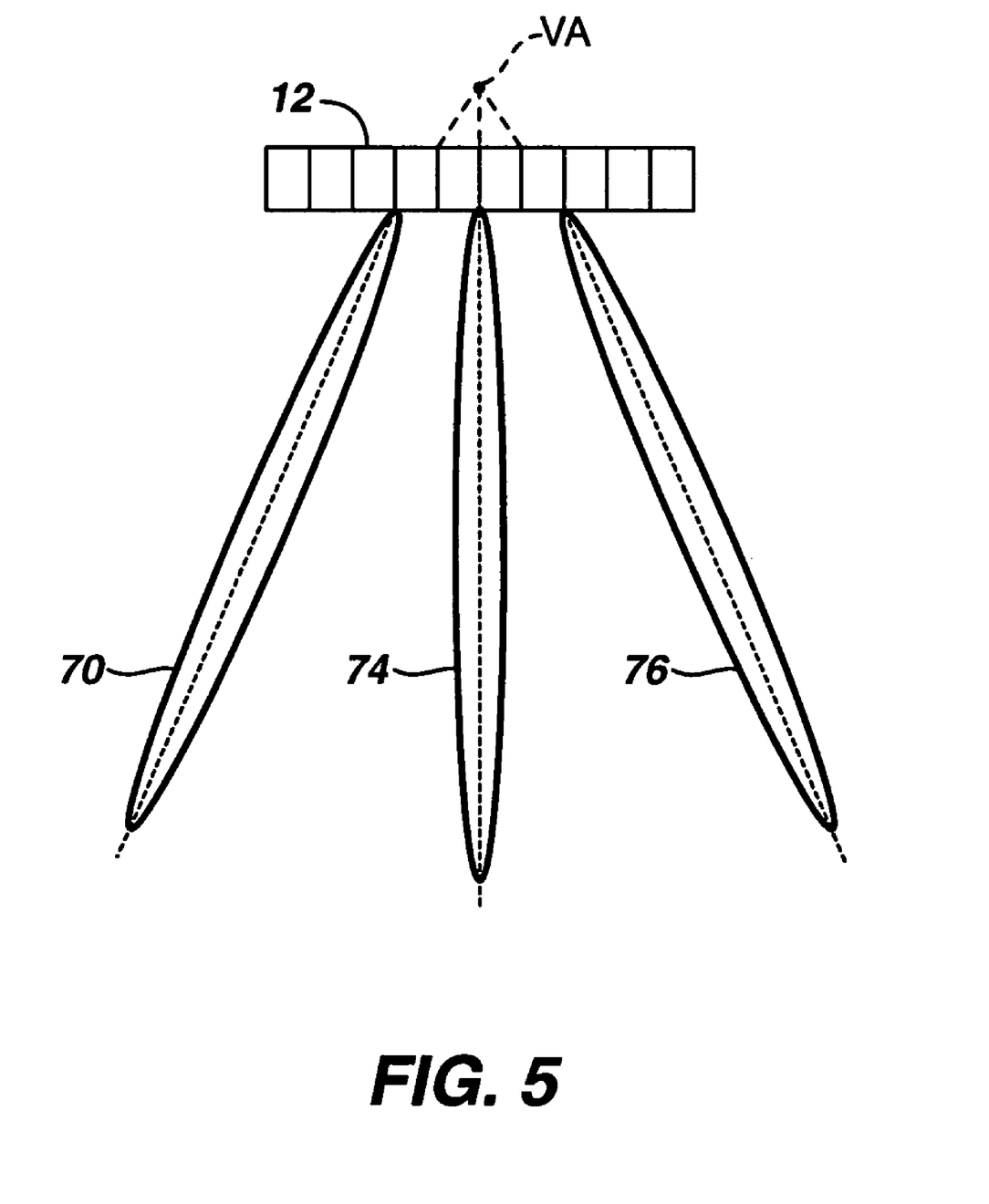
FIG. 5 illustrates a fourth embodiment of a transmit-receive sequence in accordance with the principles of the present invention.

In FIGS. 2-4 the transmit beams 70, 74, 76 are all seen to emanate from a common point on the face of the transducer array. However, virtual apex imaging can be employed as illustrated in FIG. 5. In this embodiment each of the simultaneous, differently steered beams 70, 74, and 76 originates from a different point on the face of the transducer array 12. In this example the three beams 70, 74 and 76 all have a common point of intersection VA behind the face of the array transducer, commonly referred to as the virtual apex of the scanning pattern. The virtual apex scanning pattern will advantageously reduce near field clutter as the beams are spatially separated in both the far and near regions of the image. Another scanning pattern which is within the scope of this invention is to transmit beams which emanate from two or more different points on the face of the transducer array but do not necessarily have a common virtual apex. For example, the three beams of FIG. 5 could be transmitted in parallel directions similar to the beam directions of a steered linear array. All of the beams could be steered at the same angle to the left, to the right, or all could be steered straight ahead (normal to the face of the transducer). Another variation would transmit two beams at an acute angle to the array and a third beam straight ahead, with the second and third beams sharing a common origin on the face of the array. A variety of different steering direction combinations are possible.

Figure 6:
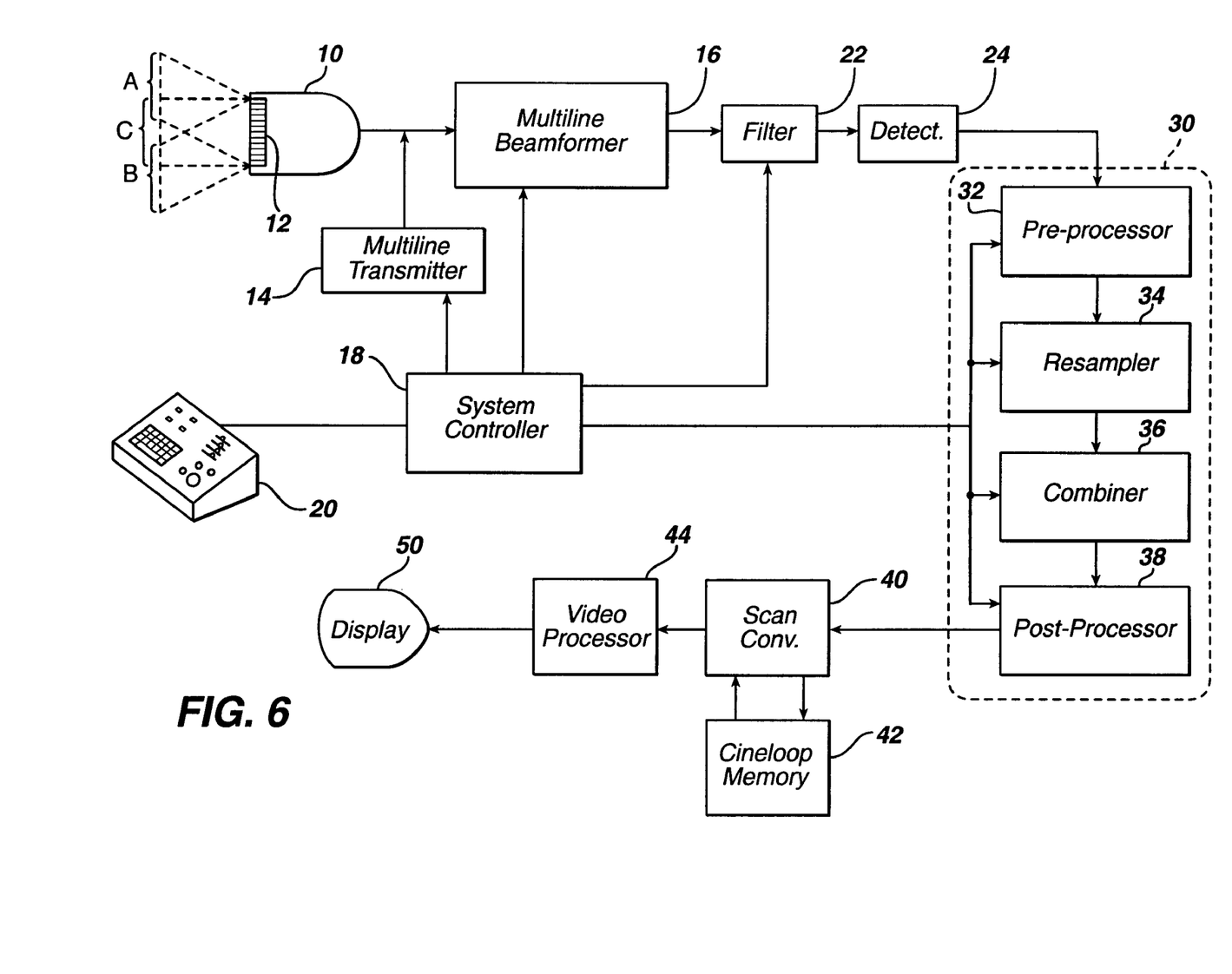
FIG. 6 illustrates in block diagram form an ultrasonic diagnostic imaging system constructed in accordance with the principles of the present invention.

FIG. 6 illustrates in block diagram form an ultrasonic diagnostic imaging system constructed in accordance with the principles of the present invention. A scanhead 10 including an array transducer 12 transmits beams at different angles over an image field denoted by the dashed rectangle and parallelograms. Three groups of scanline look directions are indicated in the drawing, labeled A, B, and C with each group being steered at a different angle (look direction) relative to the scanhead. The transmission of the beams is controlled by a multiline transmit beamformer 14 which controls the phasing and time of actuation of each of the elements of the array transducer so as to transmit each beam from a predetermined origin along the array and at a predetermined angle. In accordance with the principles of the present invention, the multiline transmit beamformer causes the array transducer 12 to transmit multiple, differently steered transmit beams simultaneously as exemplified in the preceding drawings by controlling the times at which signals are applied to the different elements of the array transducer. The echoes returned from along each scanline are received by the elements of the array and coupled to a multiline receive beamformer 16. The multiline receive beamformer delays and sums the echoes from the array elements to form a sequence of focused, coherent echo samples along each of a plurality of differently offset and/or steered, simultaneously processed receive scanlines. An example of a multiline receive beamformer suitable for use as beamformer 16 is described in U.S. patent application Ser. No. 09/746,165 filed Dec. 22, 2000 and entitled "MULTILINE ULTRASOUND BEAMFORMERS" (Henderson et al.), the contents of which are hereby incorporated by reference. The multiline transmit beamformer 14 and multiline receive beamformer 16 are operated under control of a system controller 18, which in turn is responsive to the settings of controls on a user interface 20 operated by the user of the ultrasound system. The system controller controls the multiline transmit beamformer 14 to transmit the desired number of beams during each transmit-receive interval, the desired beam angles, origins, transmit energies and frequencies. These transmit characteristics may be determined by the system controller from user settings such as the degree of spatial compounding desired (the number of different look directions) and the transmit mechanical index (MI) setting. The system controller also controls the multiline receive beamformer 16 to properly delay and combine the received echo signals for the number of beams, apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. The filter and detector generally comprise multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes, as described more fully in U.S. Pat. No. 6,224,552 (Jago et al.) The pre-processed signal samples may then undergo a resampling in a resampler 34. The resampler 34 can spatially realign the estimates of one component frame or to the pixels of the display space, as described more fully in U.S. Pat. No. 6,135,956 (Schmiesing et al.)

After resampling the image frames are compounded by a combiner 36. Combining may comprise summation, averaging, peak detection, or other linear or nonlinear combinational means. The samples being combined may also be weighted prior to combining in this step of the process. A suitable combiner is described in U.S. Pat. No. 6,547,732 (Jago). Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in acquisition data space or in display pixel space. In one implementation scan conversion is done following the compounding process by a scan converter 40. The compound images may be stored in a Cineloop®memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. No. 5,485,842 (Quistgaard), U.S. Pat. No. 5,860,924 (Quistgaard), and U.S. Pat. No. 6,471,652 (Fraser et al.) Following scan conversion the spatially compounded images are processed for display by a video processor 44 and displayed on an image display 50.

Further details of spatial compounding may be found in the aforementioned U.S. Pat. No. 6,135,956 (Schmiesing et al.), the contents of which are hereby incorporated by reference.

Figure 7:
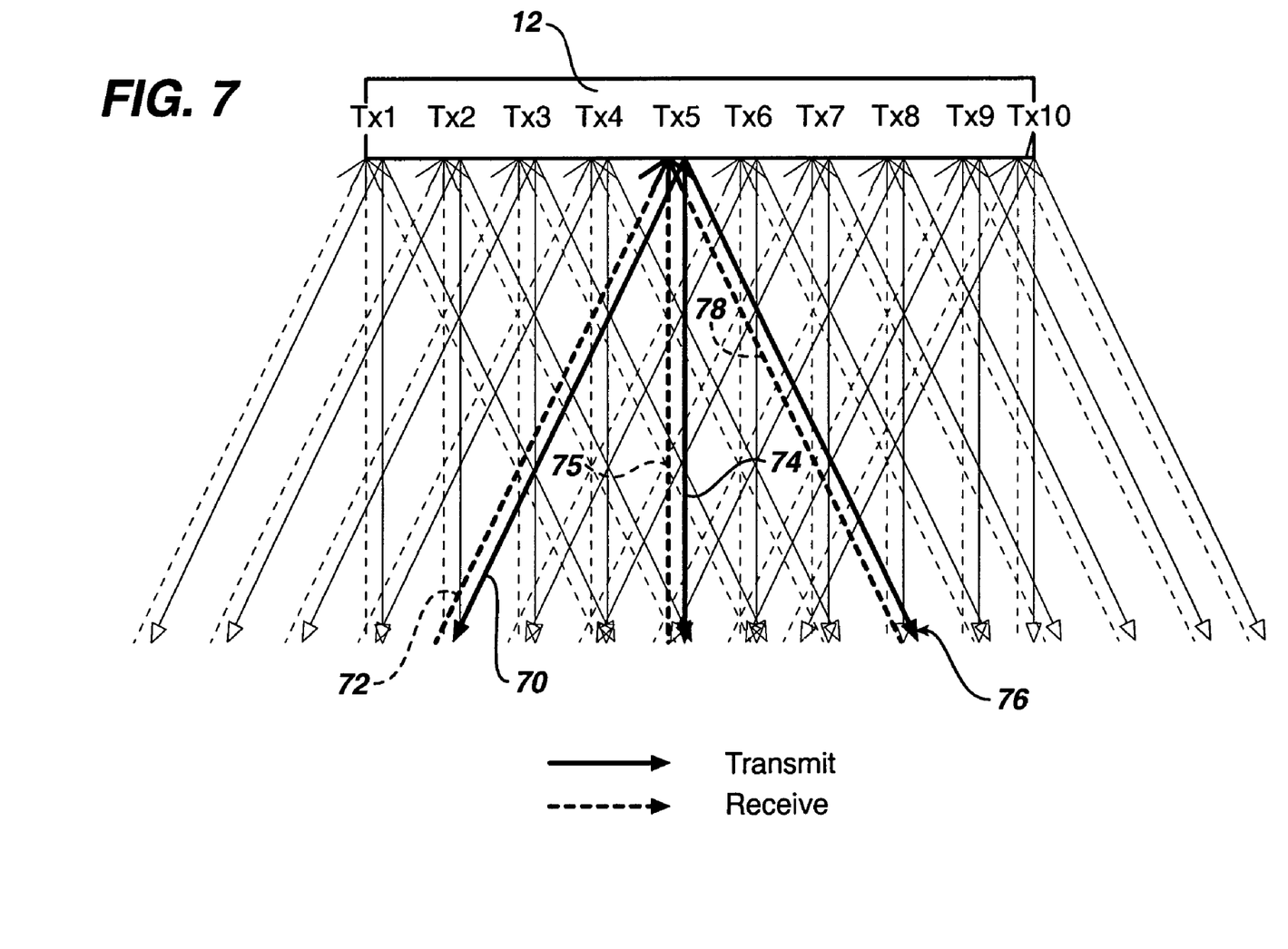
FIG. 7 illustrates the scanning of an image region with a transmit-receive sequence in accordance with the principles of the present invention.

An example of the scanning of a two dimensional image field for spatial compounding in accordance with the present invention is shown in FIG. 7. This drawing illustrates a sequence of ten transmit-receive intervals (Tx 1-Tx 10) for spatial compounding with three look directions. The beams of transmit receive interval Tx 5 are highlighted in the drawing. Each receive beam axis is aligned with the axis of its corresponding transmit beam, but for purposes of illustration the transmit and receive beams are slightly offset in the drawing. During each transmit-receive interval three transmit beams such as 70, 74 and 76 are simultaneously transmitted in three different directions: one to the left, one to the right, and one straight ahead (normal to the face of the transducer array 12). The drawing illustrates that the image field is interrogated by one group of scanlines which are steered in the left look direction, another group of scanlines which are steered in the right look direction, and a third group of scanlines which are steered in the normal look direction. The echoes from along the scanlines are combined on a spatial basis: image points in the center of the image field which are interrogated from all three look directions will be compounded by signals from all three look directions to produce an image region of maximum image quality ("RMIQ;" see U.S. Pat. No. 6,210,328 (Robinson et al.)). Image regions on either side of the RMIQ will be compounded by the combination of signals from two look directions, and image regions on the most lateral extremes of the image field will not be compounded due to their position at the extremes of the transducer aperture.

Figure 8:
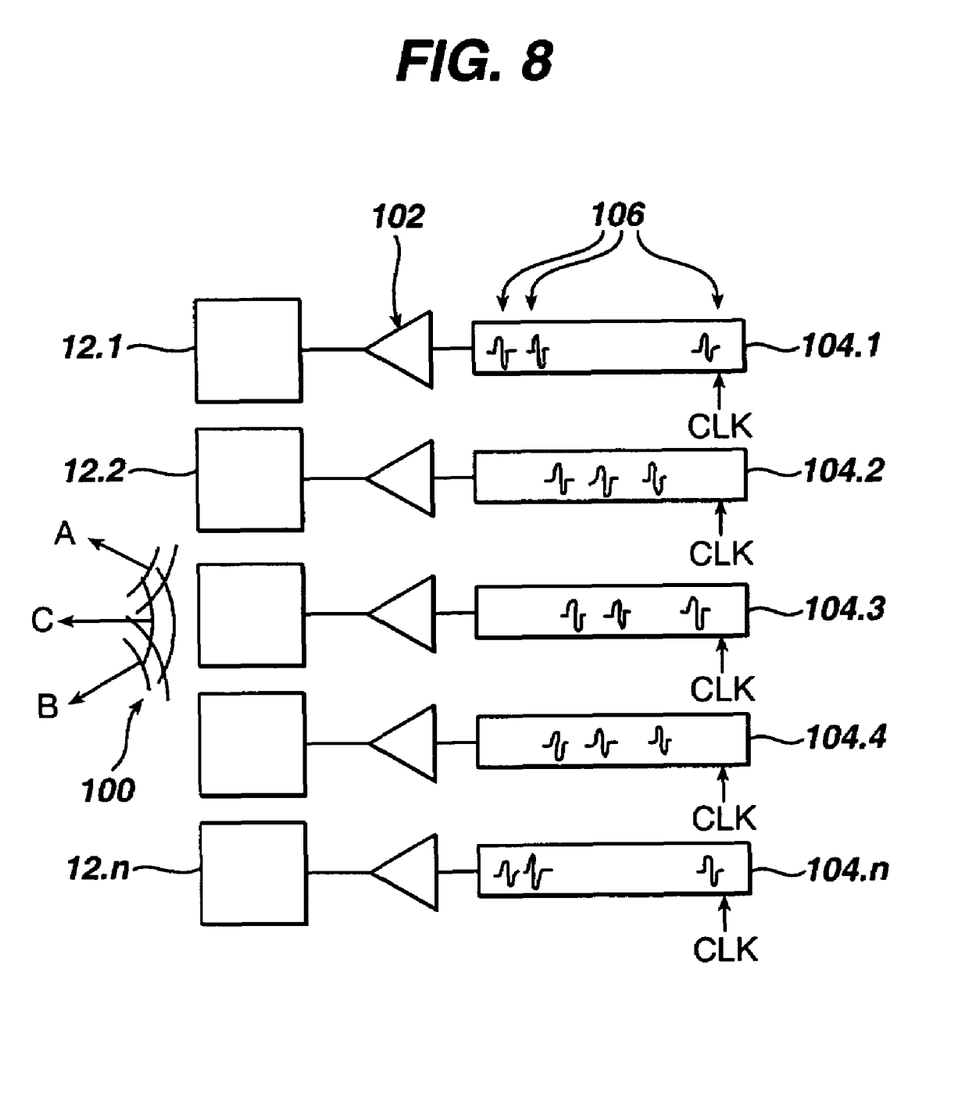
FIG. 8 illustrates a first embodiment of a transmit beamformer for implementing the present invention.

Several types of transmit beamformers can be employed to transmit the multiple simultaneous transmit beams, one of which is illustrated in block diagram form in FIG. 8. This drawing shows the elements 12.1-12.n of a transducer array which are actuated to transmit the wavefronts 100 for three beams in three directions A, B, and C. The five array elements shown in the drawing are excited by signals provided by five channels of a digital transmit beamformer shown to the right of the respective transducer elements. Each transmit beamformer channel comprises a shift register or memory 104.1-104.n which contains digital samples of a desired transmit waveform 106. The digital waveforms are positioned in the shift register or addressed in the memory such that they will be clocked out of the shift register or addressed from the memory at the respective times necessary to steer the beams of the array in the desired direction. For instance in memory/shift registers 104.1 and 104.n there are two transmit waveforms near the output of the memory/shift register and a third which is delayed at the right end of the memory/shift register. In the memory/shift registers 104.2 and 104.4 the three waveforms are in the vicinity of the center of the memory/shift register, and in memory/shift register 104.3 there are two waveforms in the center and a third at the right side of the memory/shift register. The digital waveforms are addressed or clocked out of the memory/shift registers, converted to analog waveforms by digital to analog converters 102, amplified and applied to the respective transducer elements. The individual waveforms are respectively delayed such that the beams formed by the individual element signals in the image field to the left of the transducer array will be steered in the A, B, and C directions.

Figure 9:
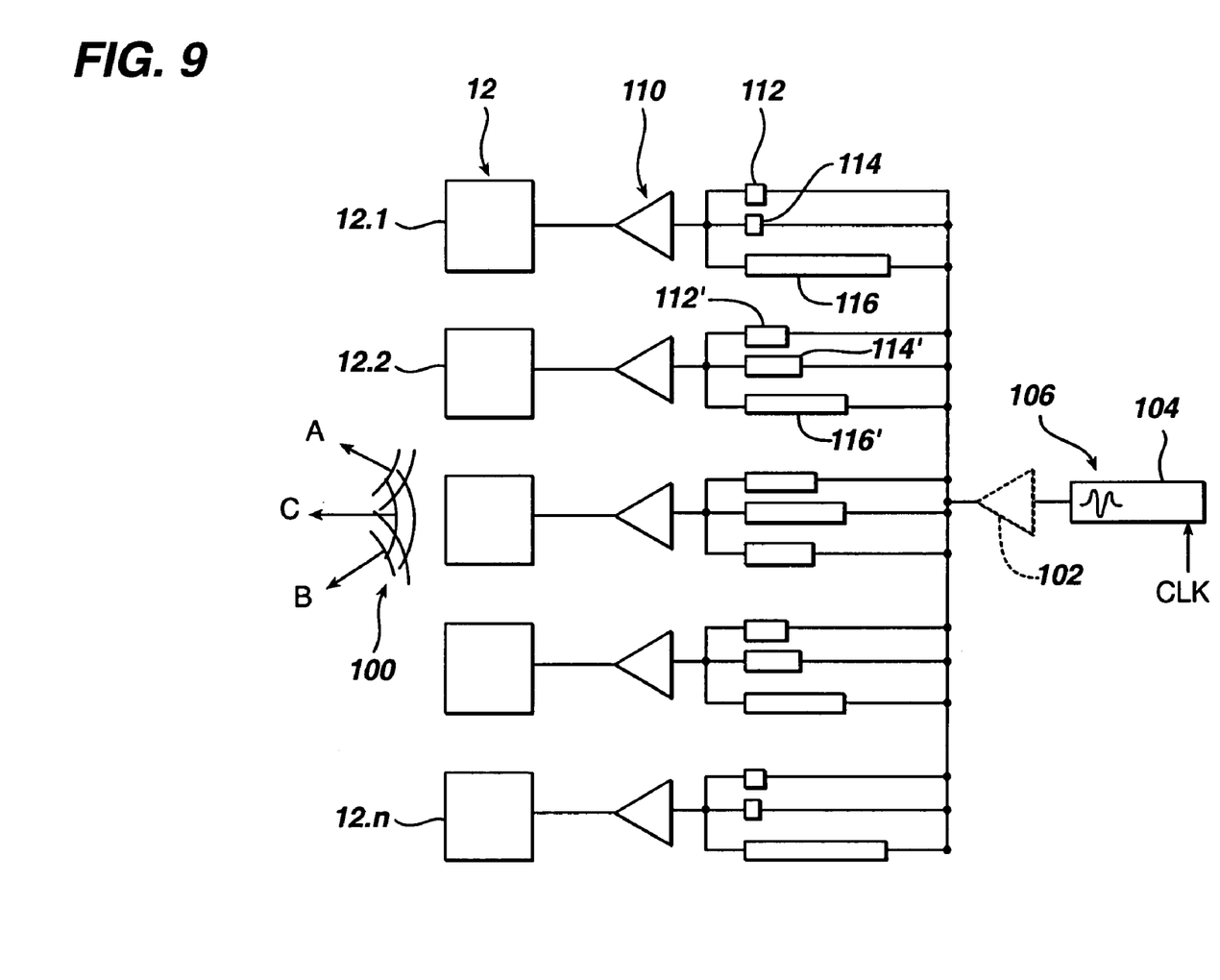
FIG. 9 illustrates a second embodiment of a transmit beamformer for implementing the present invention.

Another implementation of a three beam transmit beamformer is shown in FIG. 9. In this embodiment a single waveform 106 is applied to all of the channels of the transmit beamformer. Each channel of the transmit beamformer then applies three delays to the waveform to form three waveforms for the three beams. The waveform is produced by device 104 which may be an analog waveform generator or a digital memory/shift register as described above. When the device 104 is a digital device a digital to analog converter 102 may be employed at the output of the device 104. Alternately, digital delays may be employed in the beamformer channels and digital to analog conversion done following the delays. The uppermost beamformer channel is seen to have three delay lines 112, 114, and 116 which are appropriate for transducer element 12.1 to contribute to three beams steered in directions A, B, and C. In a similar manner, delay lines 112', 114', and 116' provide delays for the applied waveform to produce the necessary actuation signals for element 12.2 to steer the beams in directions A, B, and C. Delays for the other elements of the array are provided in the same manner. The waveform signals for each channel are amplified or converted to analog form and amplified by stages 110 of the transmit beamformer.

Figure 10:
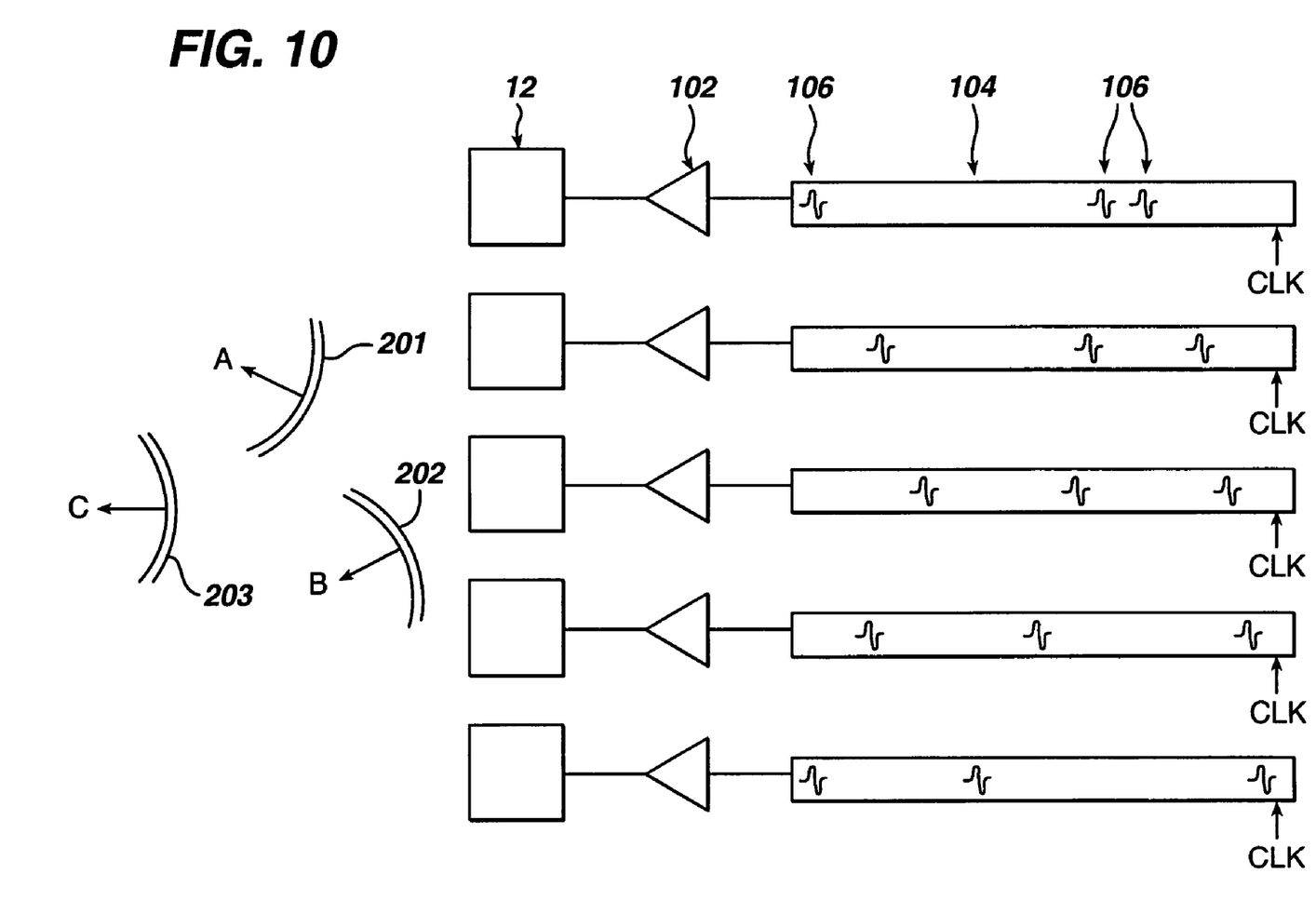
FIG. 10 illustrates a third embodiment of a transmit beamformer for implementing the present invention which transmits temporally distinct beams.

As wavefronts 100 in FIGS. 8 and 9 illustrate, the beams produced by the array transducer can overlap in time and be transmitted from the array literally at the same time. This means that the transmit voltage for one beam can be applied to a transducer element at the same time as the transmit voltage for a second and even a third beam. The drive voltage applied to the element can thus be the sum of all three waveforms. However, diagnostic ultrasound systems are regulated to have maximum transmit pressure levels for the safety of patients. In addition the maximum output voltage is limited by the power supply rails of the transmit circuitry. If the sum of all three waveforms would exceed the regulated levels or the drive capabilities of the transmitter, the output of the transducer must be limited at the maximum permissible or capable level. This would limit the effective range of the beams and hence the depth at which a diagnostic image can be produced. One way to address this problem is with the use of longer, lower amplitude, encoded transmit pulses which do not in combination exceed the applicable voltage or transmit pressure levels. Another solution to this dilemma is shown in FIG. 10, in which the three transmit beams are produced in non-overlapping temporal intervals during the same transmit-receive interval. The beams are transmitted in non-overlapping time intervals such that there is no time at which the actuation signals for two beams are concurrently applied to the array transducer. Thus, each beam can be produced at a maximal regulated power, enabling a maximal imaging depth. In the embodiment of FIG. 10 this is accomplished by longer delays 104 which assure that the waveforms 106 are provided to the elements in a non-overlapping manner. A disadvantage to this implementation is that longer total delay are required as indicated by the longer lengths of the delay lines 104 in FIG. 10. Also, a more sophisticated receive beamformer is required to track and compensate for the temporal disparities on transmit. The need for longer delay lines generally imposes an increase in the component size or area or cost for the ultrasound system.

Figure 11:
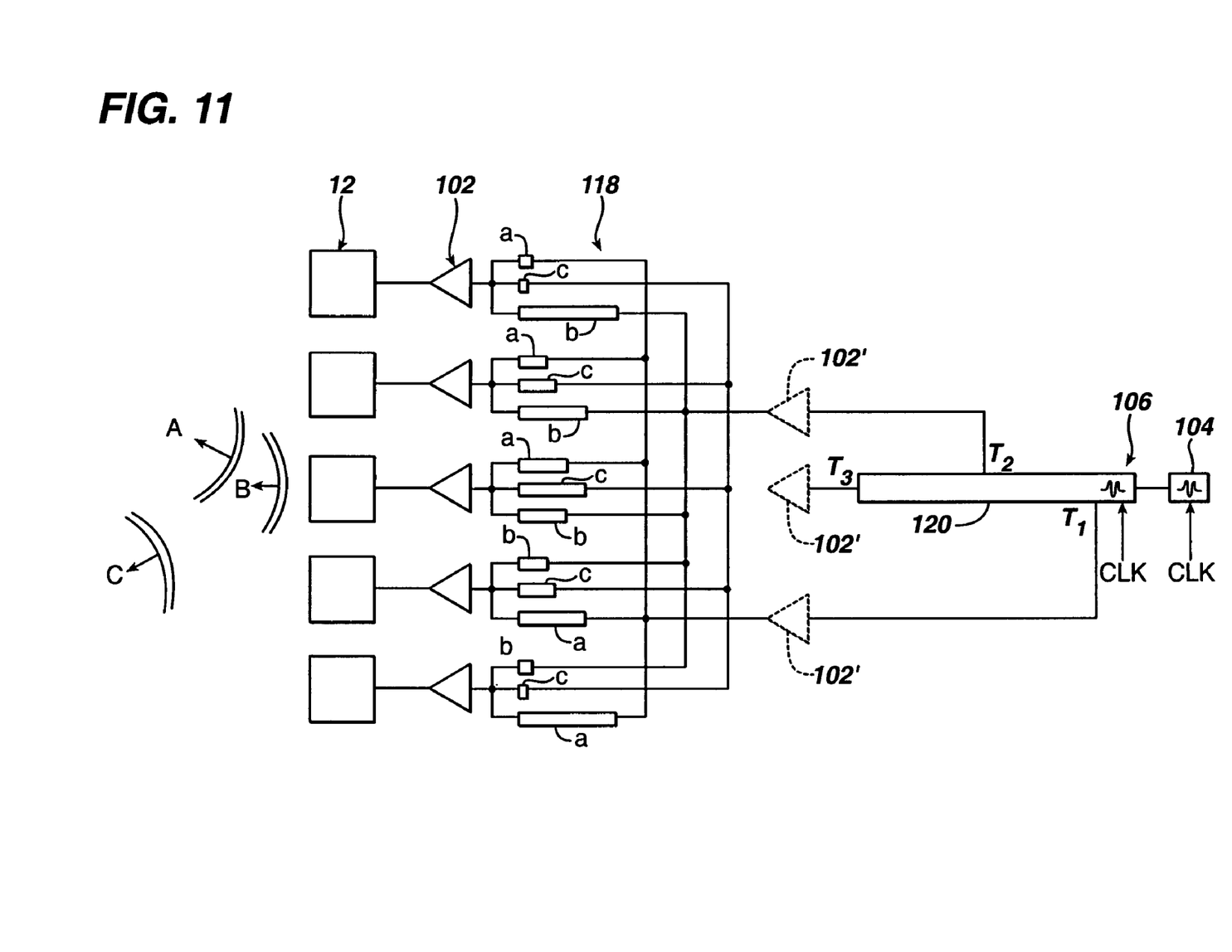
FIG. 11 illustrates a fourth embodiment of a transmit beamformer for implementing the present invention which transmits temporally distinct beams.

To reduce this disadvantage, a bulk delay 120 can be employed before the individual beam delays as shown in FIG. 11. In this embodiment the transmit waveform 106 which is applied by a waveform generator 104 proceeds from the right end of the bulk delay 120, and is clocked or addressed from right to left. When the transmit waveform 106 reaches the first tap $T_1$ of the bulk delay (which may be virtually immediately), the waveform may be converted to analog form and/or amplified by stage 102' if desired and applied to the delays a of the channel delays 118, amplified and/or converted to analog form by stages 102, and applied to the elements of transducer array 12 to produce a first transmit beam which is steered in a first direction, direction C in this example. While the transmit waveform from tap $T_1$ is being delayed by the channel delays 118, the transmit waveform 106 is proceeding to tap $T_2$ of the bulk delay 120. The waveform 106 will then be applied at a later time by tap $T_2$ to the b delays of the channel delays 118 to produce a beam steered in a second direction (A, in this example) which does not temporally overlap with the first beam C. The waveform 106 continues through the bulk delay and emanates at yet a later time from tap $T_3$ of the bulk delay 120. This signal is delayed by the c delays of the channel delays 118 and applied to the 30 transducer elements to form a third non-overlapping beam B. Since the transmit beams are not produced in a temporally overlapping manner, each beam can be produced at the maximal permissible acoustic intensity for deeper depth imaging.

In a further embodiment, signal generator 104 could be fired three separate times per transmit-receive interval, once for each beam, and delay line 120 could instead become a 1:3 demultiplexer. In yet other embodiments the same signal generator could be fired for each beam and the delay elements varied between each transmission in a time multiplexed fashion.

Clutter can develop from repetitive transmission of the near-simultaneous beams by the embodiments of FIGS. 10 and 11 in the same sequence. To reduce this clutter the sequence of transmission of the multiple beams can be changed from frame to frame or from one transmit interval to another, either in a predetermined pattern or by dithering the sequencing.

It has also been found that the greatest clutter difficulty with the above embodiments where the simultaneous beams emanate from a common point on the transducer array arises in the near field, where a virtual overlap of the beams occurs. This difficulty may be addressed by transmitting differently coded waveforms for each of the simultaneous beams so that their respective receive beams can be better distinguished through suitable receive processing which decodes the encoded signals. Orthogonal codes as are known in the art can be used to code the transmit waves for the wavefronts of the different transmit beams, a process sometimes referred to as coded excitation.

Another approach to reducing clutter is to use different transmit zones for the near and far image regions. For the far region, multiple simultaneous differently steered beams are employed as described above. In the near region conventional single line transmission and reception is used, thereby eliminating multiline transmit clutter entirely in the near region. The additional time required for this single line transmission and reception is not great because the near image region in which the most objectionable clutter occurs is relatively shallow—typically on the order of a centimeter or so. The time can be minimized by using higher frequencies for this near zone which attenuate more rapidly than do the signals from the far zone, thus minimizing deadtime requirements between transmit-receive intervals. The image displayed will in this embodiment be a combination of multiline and single line imaging when the echo signals from both zones are spatially compounded and used to form a single image frame.

What is claimed is:

1. An ultrasonic diagnostic imaging system which produces spatially compounded images comprising:
    an array transducer;
    a multiline transmit beamformer, coupled to the array transducer, which acts to cause the array transducer to simultaneously transmit multiple beams in different directions during a single transmit-receive interval;
    a multiline receive beamformer, coupled to the array transducer, which acts to form echo signals of receive beams in the different directions in response to echoes received during the single transmit-receive interval;
    a combiner, responsive to the echo signals, which acts to combine signals relating to a common point in an image field which have been received from different directions; and
    a display coupled to the combiner which displays a spatially compounded image.

2. The ultrasonic diagnostic imaging system of claim 1, wherein the multiline transmit beamformer comprises a plurality of beamformer channels, each coupled to a respective element of the array transducer, wherein each channel includes a delay line for a plurality of transmit signals for the multiple beams.

3. The ultrasonic diagnostic imaging system of claim 2, wherein the delay line comprises a serial delay line which acts to delay the multiple transmit signals in series.

4. The ultrasonic diagnostic imaging system of claim 2, wherein the delay line comprises a plurality of parallel delay line elements for the plurality of transmit signals.

5. The ultrasonic diagnostic imaging system of claim 2, wherein the delay line comprises an addressable memory.

6. The ultrasonic diagnostic imaging system of claim 2, wherein the delay line is a digital delay line, and where each channel further includes a digital to analog converter coupled to a transducer element.

7. The ultrasonic diagnostic imaging system of claim 1, wherein the multiline transmit beamformer further acts to cause the array transducer to transmit multiple orthogonally coded beams in different directions during a single transmit interval.

8. The ultrasonic diagnostic imaging system of claim 1, wherein the multiline transmit beamformer further acts to cause the array transducer to transmit multiple beams in different directions during a single transmit interval or to cause the array transducer to transmit single beams during a single transmit interval;
    wherein the multiline receive beamformer acts to form echo signals of multiple receive beams in the different directions from a greater depth during a single transmit-receive interval, and acts to form echo signals of single receive beams from a lesser depth during a single transmit-receive interval.

9. A method for forming spatially compounded ultrasonic images comprising:
    simultaneously transmitting multiple ultrasonic beams in different directions during a single transmit-receive interval;
    receiving in response to the multiple beams echo signals from the different beam directions during the single transmit-receive interval;
    combining signals received from different beam directions on a spatial basis; and
    displaying a spatially compounded ultrasonic image.

10. The method of claim 9, wherein transmitting further comprises transmitting multiple ultrasonic beams from a common point on the face of a transducer array.

11. The method of claim 9, wherein transmitting further comprises transmitting multiple ultrasonic beams emanating from different points on the face of a transducer array.

12. The method of claim 9, wherein receiving further comprises receiving multiple spatially distinct beams in response to a beam which was transmitted in a given direction.

13. The method of claim 9, wherein transmitting further comprises temporally separating the transmission of the multiple beams during a single transmit-receive interval.

14. The method of claim 13, wherein temporally separating comprises preventing the application of excessive voltages from multiple beams to a transducer element at the same time.

15. The method of claim 13, wherein temporally separating comprises preventing the development of acoustic pressure from multiple beams which exceed a diagnostic limit.

16. The method of claim 9, wherein transmitting further comprises alternatively transmitting a single ultrasonic beam during a single transmit-receive interval;
    wherein receiving further comprises receiving from a deeper depth in response to the multiple beams echo signals from different beam directions during a first transmit-receive interval, and receiving from a shallower depth in response to the transmission of a single beam during a second transmit-receive interval echo signals from a single beam direction.

17. The method of claim 9, wherein transmitting further comprises transmitting multiple ultrasonic beams in different directions so that the main lobe of a beam is not concentric with at least one side lobe of a beam of a different direction.

18. The method of claim 17, wherein transmitting further comprises tailoring an aperture or apodization function to prevent an overlap of the main lobe of a beam of one direction and a side lobe of a beam of a direction which differs from the one direction.

19. The method of claim 9, wherein receiving further comprises receiving a receive beam which is co-axial with each of the transmit beams.

* * * * *